(12) United States Patent
Berbers

(10) Patent No.: US 12,101,115 B2
(45) Date of Patent: Sep. 24, 2024

(54) OPTICAL FIBER CONNECTION MEASUREMENT SYSTEM AND METHOD

(71) Applicant: BERBERS OPTICAL NETWORK SERVICE B.V., Hendrik Ido Ambcht (NL)

(72) Inventor: Enrico François Hubert Berbers, Alblasserdam (NL)

(73) Assignee: BERBERS OPTICAL NETWORK SERVICE B.V., Hendrik Ido Ambacht (NL)

( * ) Notice: Subject to any disclaimer, the term of this patent is extended or adjusted under 35 U.S.C. 154(b) by 60 days.

(21) Appl. No.: 17/917,180

(22) PCT Filed: Apr. 15, 2021

(86) PCT No.: PCT/EP2021/059829
§ 371 (c)(1),
(2) Date: Oct. 5, 2022

(87) PCT Pub. No.: WO2021/209569
PCT Pub. Date: Oct. 21, 2021

(65) Prior Publication Data
US 2023/0163841 A1 May 25, 2023

(30) Foreign Application Priority Data
Apr. 15, 2020 (NL) .................................... 2025348

(51) Int. Cl.
*H04B 10/00* (2013.01)
*H04B 10/071* (2013.01)
*H04J 14/00* (2006.01)

(52) U.S. Cl.
CPC ................. *H04B 10/071* (2013.01)

(58) Field of Classification Search
CPC ..................................................... H04B 10/071
See application file for complete search history.

(56) References Cited

U.S. PATENT DOCUMENTS 9,240,855 B1 * 1/2016 Lam .................... H04J 14/0227
9,847,831 B2 12/2017 Archambault et al.
(Continued)

OTHER PUBLICATIONS

International Search Report and Written Opinion dated Jul. 21, 2021, for Application No. PCT/EP2021/059829 (16 pages).
(Continued)

*Primary Examiner* — Daniel G Dobson
(74) *Attorney, Agent, or Firm* — KDW Firm PLLC

(57) ABSTRACT

An optical fiber connection measurement system configured to test distal connection quality of individual outgoing optical fibers at a hub includes a test module to test a distal connection quality of one of the individual optical fibers at a time. The optical fiber connection measurement system includes a controller connected to the test module, and a switch arranged between the test module connected to an input of the switch and proximal ends of the outgoing optical fibers in the hub connected to outputs of the switch. The switch is connected to the controller and a communication module connected to the controller. The controller is configured to receive a test request via the communication module, to set the switch to optically connect the test module, a proximal end of one of the optical fibers associated with the distal end, and to activate the test module to test the connection quality.

19 Claims, 4 Drawing Sheets

(56) References Cited

U.S. PATENT DOCUMENTS

2011/0110662 A1    5/2011    Wellbrock et al.
2011/0153544 A1    6/2011    Nagel et al.

OTHER PUBLICATIONS

Yoshitaka Enomoto et al., "Design and Performance of Novel Optical Fiber Distribution and Management System With Testing Functions in Central Office", Journal of Lightwave Technology, IEEE, USA, vol. 29, No. 12, Jun. 1, 2011 (Jun. 1, 2011), p. 1818-1834.

* cited by examiner

OPTICAL FIBER CONNECTION MEASUREMENT SYSTEM AND METHOD

This application is a national stage filing under 35 U.S.C. 371 of pending International Application No. PCT/EP2021/059829, filed Apr. 15, 2021, which claims priority to Netherlands Patent Application No. 2025348, filed Apr. 15, 2020, the entirety of which applications are incorporated by reference herein.

The present disclosure relates to an optical fiber connection measurement system, configured to test distal connection quality of individual outgoing optical fibers at a hub.

In the relevant technical field, optical fibers are laid from a central hub to a distal connection, for example buildings and/or distal hubs. Herein below, distal buildings will be mentioned, without excluding distal hubs. Thereafter, distal ends of the optical fibers relative to the hub, i.e. at the buildings, need to be individually connected to local networks, for example a WiFi router or a local optical network in the building. To this end, persons are sent to each building to connect the distal end of the optical fiber there to the local network associated with the building. After establishing the connection, the person who established the local, distal connection contacts a colleague at the hub, for example via a mobile telephone connection, informing the colleague at the hub that a connection has been established, and is ready for testing the connection quality. When the colleague at the hub is on the phone with someone, other person having established local, distal connections have to wait their turn for collaboration with the colleague at the hub, causing congestion and delays. The colleague at the hub then needs to find the proximal end of the fiber with the distal end at which the person is located, who established the local, distal connection. Then the colleague at the hub needs to connect the proximal end of the fiber in question to a testing device, such as an optical time domain reflection 'OTDR' test device or module. Examples of such testing devices are available in the public domain, and manufacturers, such as Anritsu, have disclosed such testing devices. At this time, the colleague at the hub would activate the testing device, with abundant freedom to set testing parameters, even erroneously in deviation from pre-determined parameters, since the known testing devices are stand-alone units, which exhibit the possibility of an operator changing the parameter settings, dependent on a type or kind of connection testing to be performed. After the testing device completes testing of the connection quality from the hub regarding the distal connection of the optical fiber at the distal building, the result of testing is communicated to the colleague at the hub, and he would then relay the result of testing to the person who established the local, distal connection. If the test yields a positive result, the person "in the field" may relocate to a new building, establish a connection of a distal end of a further fiber cable there to a local network in or of the building and the process is repeated. However, the testing is not with certainty executed on the basis of the predetermined testing parameters, since the colleague at the hub may alter, in error for lack of experience and/or knowledge or even regretfully intentionally (to speed up the process of connecting the optical fibers to the local networks in or at the building, or cover up for a frequently mis-connecting person at the distal location, or under pressure from the optical fiber cable companies), settings of the testing device. Thus erroneously approved or disapproved distal connections may result. In practice, the negative has emerged, that up to 80% of connections approved upon installation do not comply with set standards. Moreover, the known technique requires personnel, preferably highly skilled personnel, both at the hub as well as at the distal building, which is costly. Furthermore, when the colleague at the hub is entangled with testing a made connection for one person in the field at one distal location, other persons in the field may have completed their connection tasks, but need to remain at the location of the completed connection for testing and approval/signing off, even though the outcome is unreliable, and this is inefficient especially in case the other persons at other distal locations have established their assigned connection tasks for which a test result would hold up to any standard, but these other persons at distal locations or buildings would still need to wait for the colleague at the central hub to unreliably sign off the established connection.

An optical fiber connection measurement system is known from U.S. Pat. No. 9,847,831, which is acknowledged here as the closest prior art. Additionally, US-2011/110662 is acknowledged here, but is more remote from the present disclosure than U.S. Pat. No. 9,847,831. The optical fiber connection measurement system of U.S. Pat. No. 9,847,831 is configured to test distal connection quality of individual outgoing optical fibers at a hub, and comprises:
  a test module, such as an optical time domain reflection 'OTDR' module, configured to test a distal connection quality of one of the individual optical fibers at a time;
  a controller connected to the test module;
  a switch arranged between the test module connected to an input of the switch and proximal ends of the outgoing optical fibers in the hub connected to outputs of the switch, wherein the switch is connected to the controller; and
  a communication module connected to the controller.

Therein, the controller may be connected to a server via a Data Communication Network, inter alia for receiving instructions of sorts, without clarifying the nature of such "instructions". The prior art optical fiber connection measurement system is intended to enable integration with Wavelength Division Multiplexing (WDM) systems and/or to operate in-service with such WDM systems. Consequently, the optical fiber connection measurement system known from U.S. Pat. No. 9,847,831 is directed at "in-service" testing of connection quality, mainly along the extent of cables from a proximal end to a distal end thereof, assuming that first a connection at a distal end has been installed sufficiently properly for the communications over the cables to have been initiated, after which a need for monitoring arises. For monitoring, the prior art optical fiber connection measurement system may perform tests on cables periodically in any arbitrary order, for which no instructions from the distal ends of cables is required.

Therefore, the acknowledged prior art does not address any issues with respect to installation of a distal end of an individual fiber in a connection at the remote or distal installation location. In contrast with the acknowledged prior art, the present disclosure is intended to alleviate the issues set out above with respect to current practice of testing recently installed connections of distal ends, one-at-a-time, before entering these into service and while a installation mechanic is still on site at the recently installed connection of the distal end of an individual fiber at the installation location and at that distal installation location is still available and capable to correct any errors of the installation of the distal end at the connection in the remote or distal installation location. Therefore, the present disclosure proposes to provide an optical fiber connection measurement system, which is distinguished over the above acknowledged prior art with respect to the features that the controller is configured to:

receive a test request via the communication module from a distal end of one of the outgoing optical fibers, set the switch to optically connect the test module and a proximal end of one of the optical fibers associated with the distal end from which the test request is received, and activate the test module to test the connection quality of the one of the optical fibers associated with the distal end from which the test request is received.

As a consequence of the novel features according to the present disclosure, a colleague at the hub may be omitted. Furthermore, tampering with testing parameters of testing equipment may be eliminated, for example by imposing in or on the test module testing parameters for a test to be performed, whereby testing reliability may be improved and become more objective and withstand reversal of initial test results in case of later verification testing.

A corresponding computer implemented method is also disclosed, as well as a non-transitory computer-readable storage medium storing instructions that, when executed by a processor, cause the processor to perform the method.

In an exemplary embodiment, the switch is an optical mechanical switch.

In an exemplary additional or alternative embodiment, the switch comprises at least one second input to connect a device, such as a laser, in addition to the test module, to a proximal end of one of the optical fibers. This allows establishment of a correlation between proximal ends of optical fiber cables and distal ends thereof, by shining laser light through optical fibers, and having a report back about the distal ends of optical fibers from which laser light emanates.

In an exemplary additional or alternative embodiment, the system further comprises at least one proximal extension or launch fiber for a reflection based connection quality test, wherein the proximal extension or launch fiber may be arranged between the input of the switch and the test module. However, normally, a plurality of proximal extension or launch fibers are arranged between the outputs of the switch and proximal ends of individual outgoing optical fibers.

In an embodiment with a plurality of inputs of the switch, each input may be provided with proximal extension or launch fibers in a carrier or housing for connection to the input and the at least one second input. This allows parallel connection of the laser and the testing module to parallel optical fiber cables. Likewise, in an embodiment with a plurality of outputs of the switch, each output may be provided with a proximal extension or launch fiber in a carrier or housing for connection to the one of the outputs and at least one of the proximal ends of individual outgoing optical fibers.

In an exemplary additional or alternative embodiment, the system may comprise at least one of a mains connection and a battery. This allows the system, or at least the portion in or at the hub, to be stand-alone, and potentially even independent of a mains connection, when a battery is deployed.

In an exemplary additional or alternative embodiment, the communication module is a device from a group, comprising: an optical transceiver, a mobile phone, and an input/output device of a computer. Additionally or alternatively, the computer may embody the controller. In an embodiment, wherein the communication module is an optical transceiver, communications between the communication module and the controller on the one hand and the distal or remote installation location on the other hand may be performed over precisely the optical fiber of which the installation quality in the connection at the remote or distal installation location is tested.

In an exemplary additional or alternative embodiment, at least one of the test module and the controller is configured to connect to a remote server for any one or more than one of upload of connection quality test results and download of test module setting parameters. This feature, in particular, can serve to prevent a change in testing parameters relative to predetermined setting, and also enables registration of test results for even individual persons "in the field" to be able to detect trends of connection quality for these individual persons "in the field", and be able to determine their individual quality of establishing connections at distal locations. Moreover, the information at the servers allows for an even more knowledgeable person to be called upon and become involved in the testing process, when the person "in the field"—who may be considerably less knowledgeable than according to prior technologies—runs into repeated disapproval of the connections made by him or her. The person "in the field" may consult and involve the more knowledgeable person as a kind of second line help desk at a distance, via the communication opportunities made available in accordance with the present disclosure. The more knowledgeable person may then have access to a database at the server.

In an exemplary additional or alternative embodiment, the system further comprises a mobile communication device, such as an optical transceiver, a mobile phone, a tablet and/or a computer. These may be carried to the distal location by the person "in the field" to communicate with the portion of the system at or in the hub. In such an embodiment, the mobile communication device may be configured to communicate at least the test request to the communication module and the controller from the distal end of the one of the outgoing optical fibers. Thus, the person "in the field" is able to make known that a connection has been established and installed and is ready to be tested, by sending a test request.

Additionally or alternatively, at least one of the communication module, the test module and the controller may be configured to connect to a user device for at least upload of connection quality test results, to inform the user, through the user device, of the connection quality test results upon installation of the connection.

In an exemplary additional or alternative embodiment, the system further comprises a distal extension or launch fiber for a reflection based connection quality test, wherein the distal extension or launch fiber is at least connectable to the distal end of the one of the outgoing optical fibers.

Following the above reference to aspects of the present disclosure in terms and expressions of the appended claims, below an embodiment description is provided with reference to the appended drawing, exhibiting potential embodiments of the present disclosure, to which the scope of protection for the present disclosure is by no means limited and may even encompass, in particular for specific jurisdictions alternatives for aspects and features of appended independent claims. In distinct figures of the appended drawing the same or similar reference signs may be used to identify the same or similar features, aspects, element, components and functional groups thereof, even if referenced in relation to distinct embodiments. In the drawing:

Figure 3:
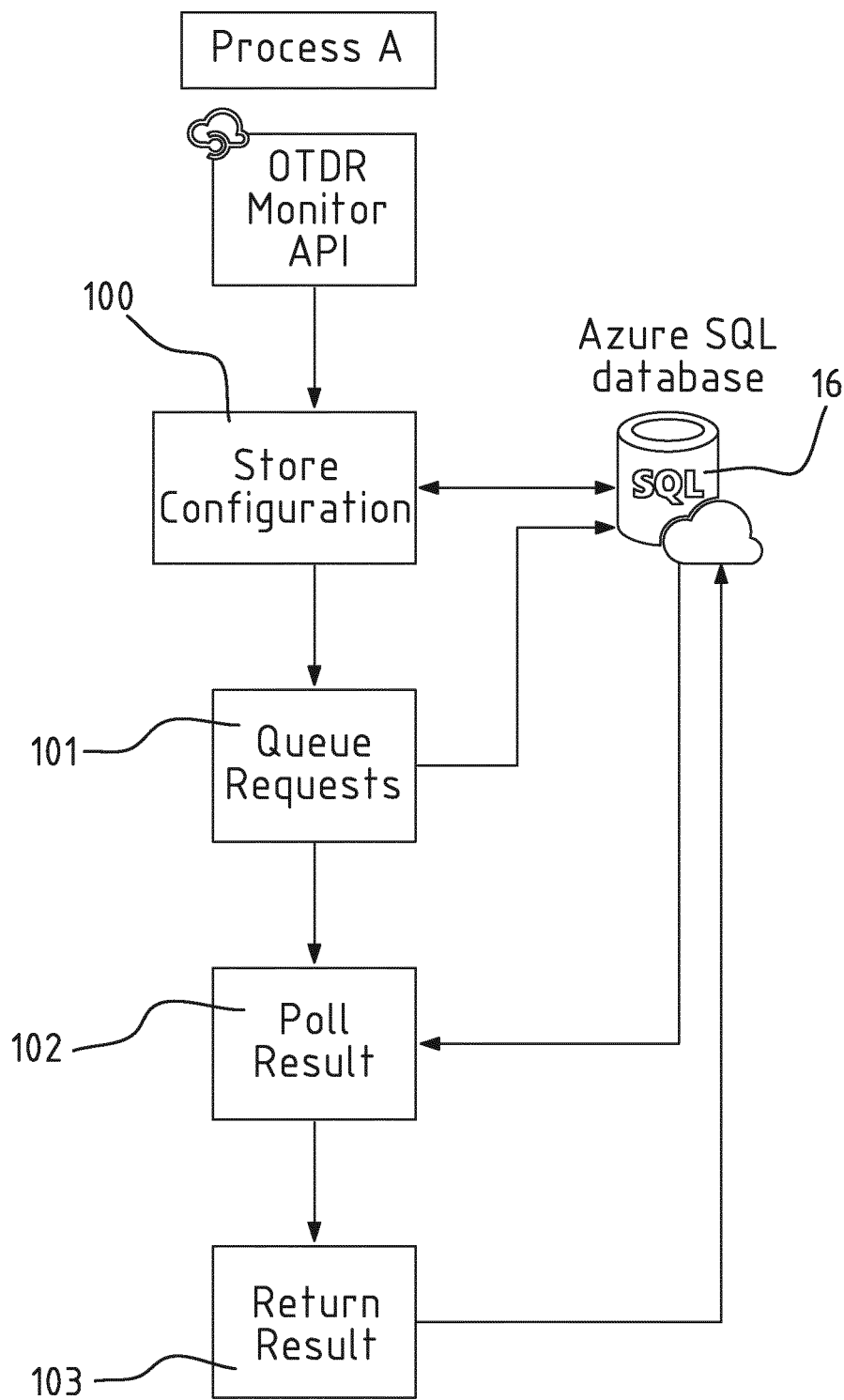
Figure 4:
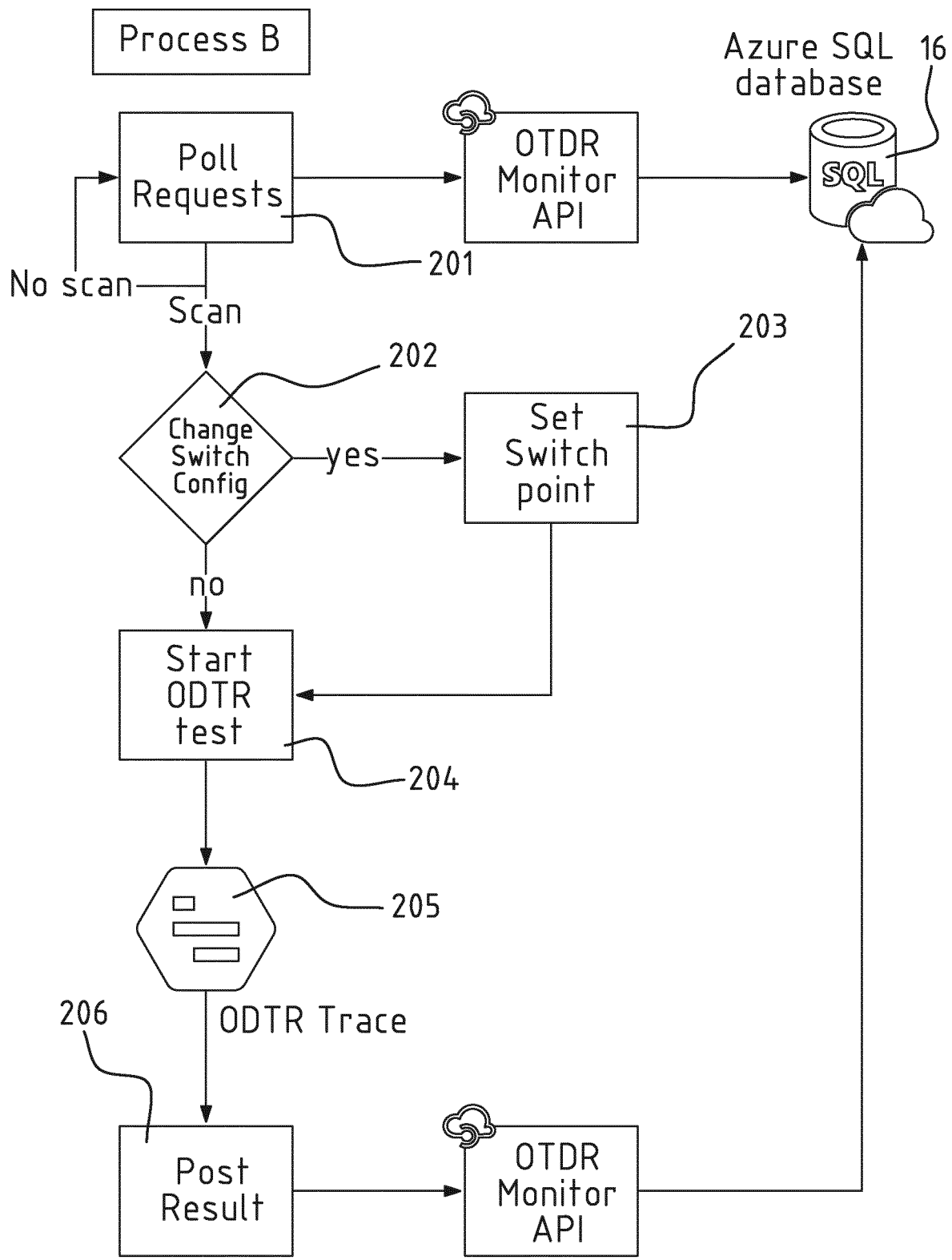
Figure 5:
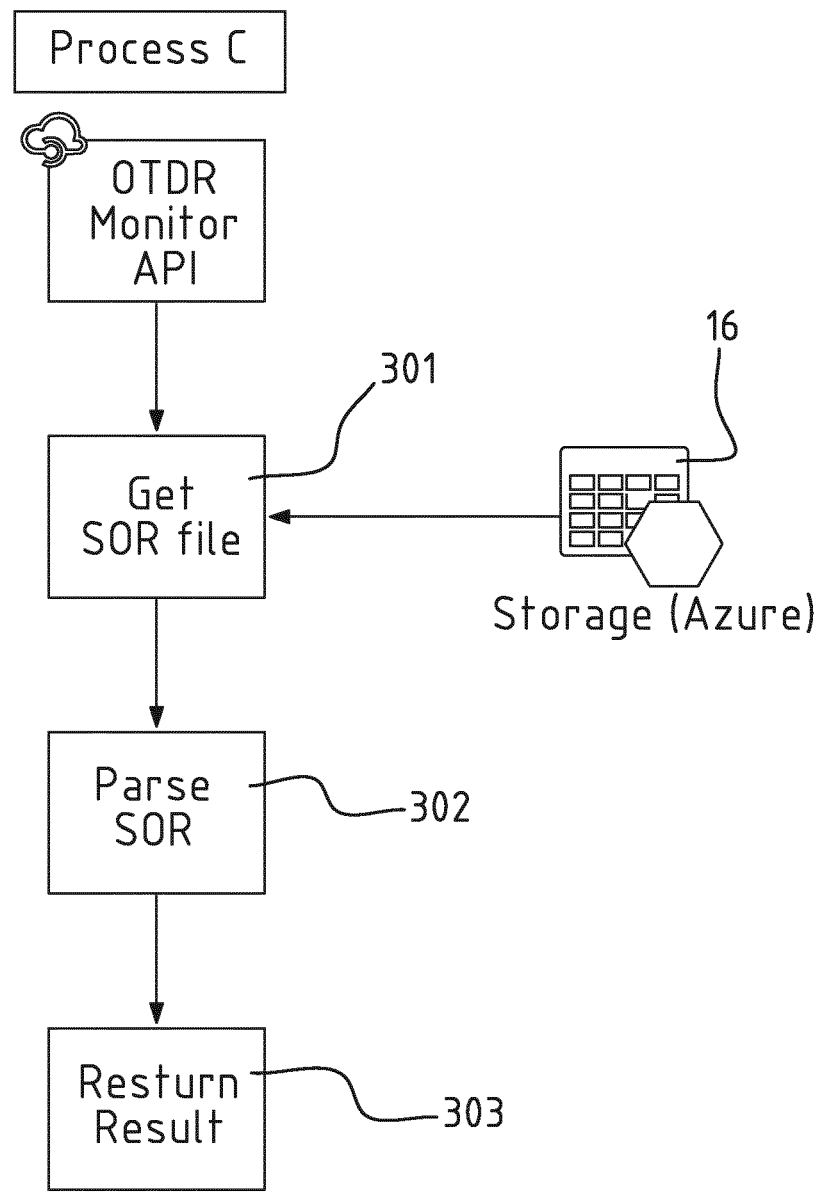

FIGS. 3-5 exhibit flow charts of (partial) operations performed in or by the system according to the present disclosure.

Figure 1:
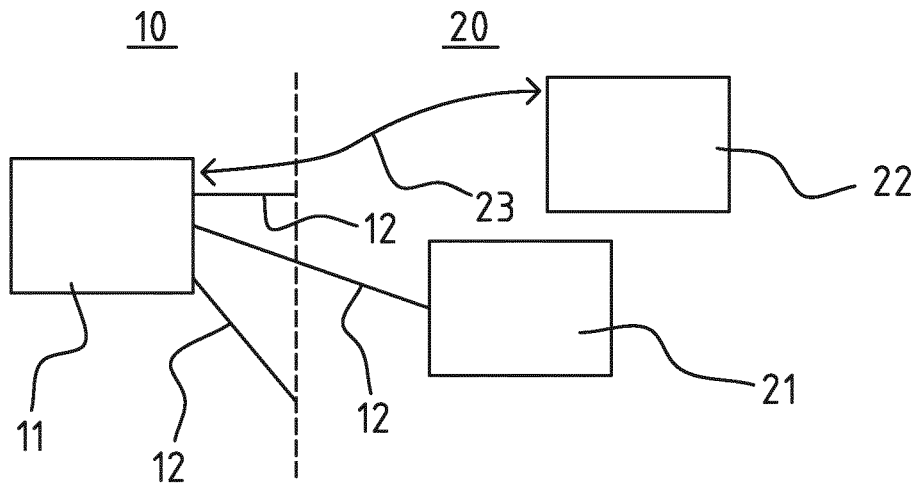
FIG. 1 shows a system according to an embodiment of the present disclosure.
Figure 2:
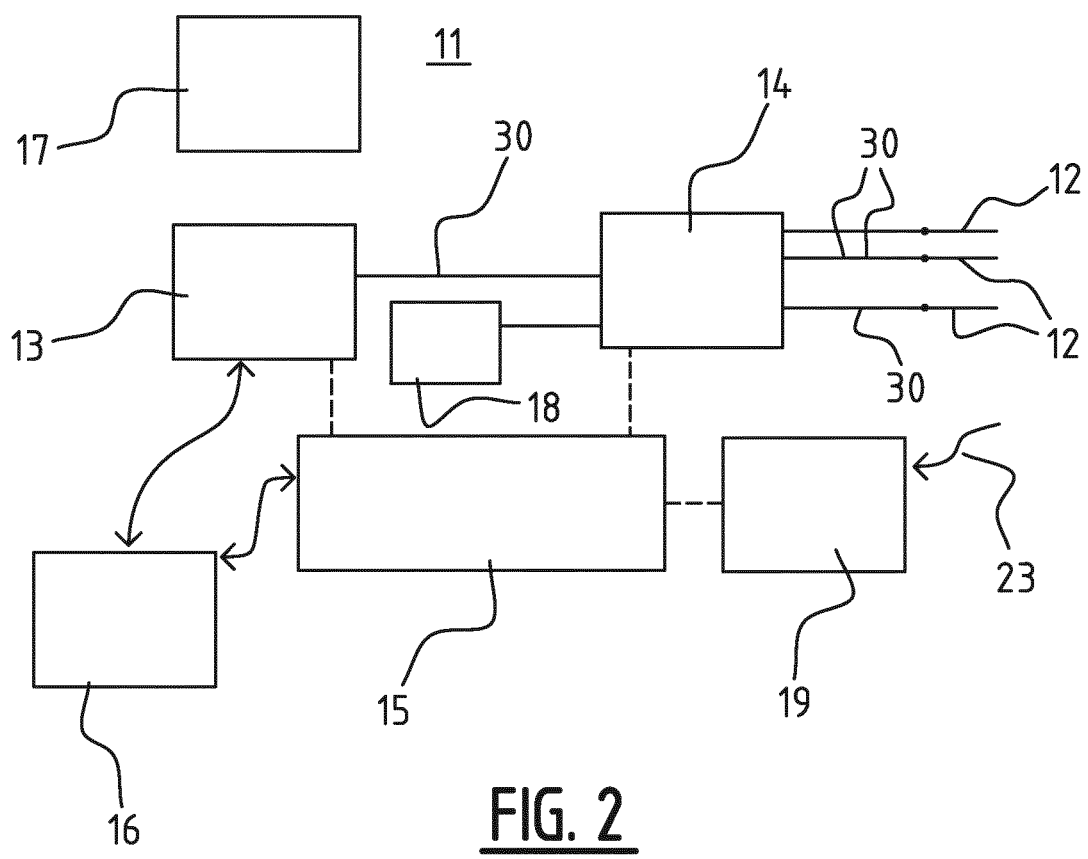
FIG. 2 shows a portion of the system in FIG. 1.

FIGS. 1 and 2 shows an optical fiber connection measurement system 11, 22, configured to test distal installation and connection quality of individual outgoing optical fibers 12 at a hub 10. Individual optical fibers 12 extend between proximal, central hub 10 and one of a number of distal buildings 20, forming remote or distal installation locations, of which one building 20 is shown schematically in FIG. 1. The optical fibers 12 may form part of a cable, and be buried between hub 10 and building 20, or extend along poles. At the one of the buildings, a connection 21 is installed by a person to the distal end of the optical cable 12. The system 11, 22 of the present disclosure is configured to establish whether or not the connection 21 has been installed to specifications, i.e. complies with predetermined quality standards.

To this end, the present disclosure proposes to provide an optical fiber connection measurement system 11, 22, configured to test adequate installation quality of the distal connection 21 of individual outgoing optical fibers 12 at a hub 20. A portion 11 of the system 11, 22 comprises a test module 13. In more detail, test module 13 may be embodied as an optical time domain reflection 'OTDR' module, configured to test a distal connection quality of one of the individual optical fibers at a time. A controller 15 is provided, which is connected to the test module 13. A switch 14 is arranged between the test module 13, which is connected to an input of the switch 14, and proximal ends of the outgoing optical fibers 12 in the hub 10. The proximal ends of optical fibers 12 are connected to outputs of the switch. The switch 14 is also, like the test module 13, connected to the controller 15. A communication module 19 is provided for external communication and is likewise connected to the controller 15. The controller may be embodied as a computer, with a communication device integrated therein, in which case a communication module 19 need not be separate from the controller 15, as shown in FIG. 1.

A program from a non-transitory computer-readable storage medium is loaded in controller to, when instructions according to the program are executed by the controller, cause the controller to perform the following steps of a method.

When the controller 15 receives a test request via the communication module 19 from a person performing installation of the connection, who is then at a distal end of one of the outgoing optical fibers 12, the switch 14 is set to optically connect the test module 13 and a proximal end of one of the optical fibers 12 associated with the distal end from which the test request is received. Thereafter, the controller 15 activates the test module 13 to test the connection quality of the one of the optical fibers 12 associated with the distal end from which the test request is received. In an embodiment, in which a server 16 is provided for communications to monitor and process aspects of testing in addition to or as an alternative for the controller 15, the test request may be processed in server 16, after which controller 15 may poll server 16 for any outstanding test requests, which may originate from anywhere in the world.

The switch 14 may be embodied as an optical mechanical switch. The switch 14 may comprise at least one second input to connect a device, such as a laser 18, in addition to the test module 13, to a proximal end of one of the optical fibers 12. This allows establishment of a correlation between proximal ends of optical fibers 12 and distal ends thereof, by shining laser light from laser 18 through optical fibers 12, and having a report back about the distal ends of optical fibers 12 from which laser light emanates.

Further, a proximal extension or launch fiber 30 may be provided for a reflection based connection quality test. The proximal extension or launch fiber 30 may be arranged between the input of the switch 14 and the test module 13. However, additionally or alternatively, a plurality of proximal extension or launch fibers 30 are arranged between outputs of switch 14 and proximal ends of individual outgoing optical fibers 12. A typical length of such a proximal extension or launch fiber 30 may be arbitrary, but for example the length may be at least 500 m.

In an embodiment with a plurality of inputs of the switch 14, each input may be provided with one or more proximal extension or launch fibers 30 in a carrier or housing for connection to the input and the at least one second input of switch 14. This allows parallel connection of for example laser 18 or any other device and testing module 13 to parallel optical fibers 12. More in particular a cassette may be provided to contain at least as many extension or launch fibers 30 as a maximum number of inputs of switches 14 encountered in hubs 10. Likewise, in an embodiment with a plurality of outputs of switch 14, each output may be provided with a proximal extension or launch fiber 30 in a carrier or housing for connection to the one of the outputs of switch 14 and at least one of the proximal ends of individual outgoing optical fibers 12. Any accommodation for at least one launch fiber 30 may stand alone or be integrated in a case, with the test module 13 or the same or another case with the switch 14, and the like. Any accommodation for at least one extension or launch fiber 30 may contain a plurality of such fibers 30.

At least one of a mains connection and a battery 17 may be provided. This allows the system, or at least the portion 11 thereof in or at the hub, where a mains connection is not always available, to be stand-alone, and potentially even independent of a mains connection, when a battery 17 is deployed. Connection of battery 17 to other parts of the portion 11 of the system 11, 22 are not shown, but self-evident, for power supply to the test module 13, switch 14, controller 15, laser 18, and communication module 19.

The communication module 19 may be a device from a group, comprising: an optical transceiver, a mobile phone, and an input/output device of a computer, wherein the computer may embody the controller 15. When an optical transceiver is used, communications may be received from a distal end of one of the optical fibers 12 via the optical fiber 12 itself Even when testing will establish that a connection quality is poor, this manner of communication from the distal end of the optical fibers 12 with the controller 15 may prove to be useful, nonetheless.

At least one of the test module 13 and the controller 15 may be connected to a remote server 16. This is indicated in FIG. 2 by two curved and double pointed arrows, of which at least on needs to be embodied, when a connection to a remote server 16 is required. Thereby, one or more than one of upload of connection quality test results from the test module 13 and download of test module setting parameters for the test module 13 may be embodied. This feature, in particular, can serve to prevent a change in testing parameters relative to predetermined setting, and also enables registration of test results for even individual persons "in the field" to be able to detect trends of connection quality for these individual persons "in the field", and be able to determine their individual quality of establishing connections at distal locations of buildings 20. Moreover, the information at the servers allows for an even more knowledgeable person to be called upon and become involved in the testing process, when the person "in the field"—who may be considerably less knowledgeable than according to prior technologies—runs into repeated disapproval of the connections 21 made by him or her. The person "in the field" may consult and involve the more knowledgeable person as a kind of second line help desk at a distance, via the communication opportunities made available in accordance with the present disclosure. The more knowledgeable person may then have access to a database at the server.

Further, a mobile communication device 22 may be provided, such as an optical transceiver, a mobile phone, a tablet and/or a computer. Mobile communication device 22 may be carried to the distal location of building 20 by the person "in the field" to communicate with communication module 19 at or in hub 20 via a communication channel 23. In such an embodiment, mobile communication device 22 may be configured to communicate at least the test request to communication module 19 and controller 15 from the distal end of the one of outgoing optical fibers 12. Thus, the person "in the field" is able to make known that a connection 21 has been established and is ready to be tested, by sending a test request via channel 23 to communication module 19 and controller 15. As indicated above, the channel may encompass the one of the optical fibers 12. Additionally or alternatively, communications may be executed via server 16.

At building 20, the system may comprise a distal extension or launch fiber 30 for a reflection based connection quality test. Distal extension or launch fiber 30 is at least connectable to the distal end of the one of the outgoing optical fibers 12. A typical length of such a distal extension or launch fiber 30 may be arbitrary, and may by at least 500 meter.

In FIGS. 1, 2, optical fibers are indicated with full drawn lines. Test data and test requests are transmitted via channels indicated with arrows or dashed lines.

Herein below FIGS. 3-5, exhibiting flow charts of (partial) processes executed in or by the system of the present disclosure, are described.

FIG. 3 relates to interaction between a distal user's mobile device and server 16. Such interaction involves storing the configuration in step 100. The mobile device may upload a test request in step 102, for server 16 to put into a queue, which may be polled by controller 15. The mobile device may thereafter intermittently poll server 16 whether test results are already available in step 102, to download test results in step 103.

When initializing test module 13, embodied for example as an ODTR device, a configuration there for may be requested and obtained from server 16 in step 100, and stored in test module 13. However, the test configuration for the OTDR device 13 may be withheld on server 16, until an actual test request is queued in server 16 and polled by controller 15. This way the configuration may be adapted to any specifically requested test. Likewise, a switch configuration may be only obtained from server 16, upon a test request at server 16 being polled and detected by controller 15, as in step 201 of FIG. 4.The configuration may encompass test parameters, to ensure uniform testing and avoid any tampering, as well a switch settings. In operation, server 16 maintains a queue for incoming test requests. When a test request is queued in server 16, and polled by controller 15 in step 201, submitted from the distal end of one of the optical fibers 12, the OTDR device 13 and switch 14 may be configured and set, wherein the switch point is set in step 203, in correspondence with the requested test, and testing may thereafter be performed in step 204. Only after a test request is encountered in step 201, does controller 15 determine whether the configuration of switch 14 needs to be changed in step 203, to connect test module 13 with a desired one of the optical fibers 12, in step 202. Further, for test module 13 or OTDR device to generate results, additional input may be required from server 16 in between steps 201 and 202. Thereby, testing may be adapted to circumstantial parameters, such as a distance between hub 10 and building 20, and the like.

When controller 15 has established that test results are available from test module 13, for example in the form of OTDR traces in step 205, these may be uploaded to server 16 after step 206, or forwarded to the person "in the field" when realtime measurements are performed. Normally, the results may be uploaded to server 16 and polled by the mobile device of the person "in the field", to provide information whether the connection 21 is up to standard and approved, or not. This feedback may include graphic representations of OTDR traces, and compliance with minimal requirements regarding connection 21.

In the meantime, controller 15 monitors or polls whether OTDR traces forming test results have become available from OTDR device 13, before uploading test results to server 16.

If needed, the configuration change is effected in step 203, and thereafter test module 13 is activated to start testing in step 204. Test results are obtained in the form of OTDR traces in step 205, if test module 13 is embodied in the form of OTDR device 13, for which controller 15 may act as a monitor. The test results, for example in the form of the OTDR traces, may be accumulated in a SOR file, and may then be uploaded to or posted on server 16 in step 206 or may be sent to the person in the field. However, before uploading or posting test results on the server or sending these to the person in the field, the test results may first be analyzed by the controller, or the server or the mobile communication device 22 of the person in the field may be able to perform such analysis.

The test results are obtained by server 16 from controller 15 in step 301, or may be obtained by server 16 directly from test module 13 or the OTDR device. By uploading test results, such as a SOR file with OTDR traces, to server 16, re-evaluation thereof at a later time is possible. Likewise, the mobile communication device 22 of the person in the field (or any other computer with access to the server 16) may be able to obtain the SOR file containing OTDR traces from server 16 and analyse the data to render a decision whether or not the test has a positive outcome. To this end, server 16, controller 15 or mobile communication device 22 may parse the SOR file containing OTDR traces in step 302, to transform the data into a visual representation, including a comparison with standards to arrive at the decision whether or not the test has a positive outcome. Normally, parsing of step 302 swill be performed by server 16, to make results available to either or both of the mobile device and the hub 10. The processed data on server 16 may be sent to or downloaded by mobile communication device 22 of the person in the field, to inform the person in the field whether he or she may relocate to another building for connection of a new optical fiber 12 there, only if the test result is positive.

It should be noted here that, evidently, the present disclosure allow for many additional and/or alternative embodiments relative to those explicitly depicted in the appended drawings and described above in relation thereto. Consequently the scope of protection according to the also appended claims is by no means limited to the explicitly shown and described embodiments, but encompasses alternative and additional embodiments, even if not explicitly referred to, and also encompasses even obvious alternatives in certain jurisdictions for elements and components of the appended independent claims. For example, it may appear to the skilled person that the platform to support embodiments of the invention is—in the above embodiment description—Azure or a platform related thereto. However, any suitable platform may be used. Further, the portion 11 of the system according to the present disclosure may be introduced into the hub 10 temporarily, at initiation of the optical fiber network extending between hub 10 and buildings 20, and be removed thereafter. However, it is equally possible that the portion 11 of the system is left at hub 10 for later network monitoring to, for example, be able to monitor network degradation or performance. Controller 15 and communication module 19 may be integrated into a single computer. Communication module 19 and communication device 22 may communicate over a wireless network, such as 4G or 5G, but may also communicate over a wired network, even including the laid optical fiber.

The invention claimed is:

1. An optical fiber connection measurement system, configured to test adequate installation quality of a distal connection of individual outgoing optical fibers at a hub, before entering the individual outgoing fibers into service, comprising:
    a test module configured to test a distal connection quality of one of the individual optical fibers at a time;
    a controller connected to the test module;
    a switch arranged between the test module connected to an input of the switch and proximal ends of the outgoing optical fibers in the hub connected to outputs of the switch, wherein the switch is connected to the controller; and
    a communication module connected to the controller, wherein the controller is configured to:
    receive a test request via the communication module from a distal end of one of the outgoing optical fibers, after installation of the distal connection,
    set the switch to optically connect the test module and a proximal end of one of the optical fibers associated with the distal end from which the test request is received, and
    activate the test module to test the connection quality of the one of the optical fibers associated with the distal end from which the test request is received.

2. The optical fiber connection measurement system according to claim 1, wherein the switch is an optical mechanical switch.

3. The optical fiber connection measurement system according to claim 1, wherein the switch comprises at least one second input to connect a device, such as a laser, in addition to the test module, to a proximal end of one of the optical fibers.

4. The optical fiber connection measurement system according to claim 1, further comprising a proximal extension or launch fiber for a reflection based connection quality test, wherein the proximal extension or launch fiber is arranged between the input of the switch and the test module or a plurality of proximal extension or launch fibers are arranged between outputs of the switch and proximal ends of individual outgoing optical fibers.

5. The optical fiber connection measurement system according to claim 3, further comprising a proximal extension or launch fiber for a reflection based connection quality test, wherein the proximal extension or launch fiber is arranged between the input of the switch and the test module or a plurality of proximal extension or launch fibers are arranged between outputs of the switch and proximal ends of individual outgoing optical fibers;
    wherein a plurality of proximal extension or launch fibers is provided in a carrier or housing for connection to the input and the at least one second input, or to outputs of the switch and proximal ends of individual outgoing optical fibers.

6. The optical fiber connection measurement system according to claim 1, further comprising at least one of a mains connection and a battery.

7. The optical fiber connection measurement system according to claim 1, wherein the communication module is a device from a group comprising: an optical transceiver, a mobile phone, and an input/output device of a computer.

8. The optical fiber connection measurement system according to claim 1, wherein the computer embodies the controller.

9. The optical fiber connection measurement system according to claim 1, wherein at least one of the communication module, the test module and the controller is configured to connect to a remote server for any one or more than one of upload of connection quality test results and download of test module setting parameters.

10. The optical fiber connection measurement system according to claim 1, further comprising a mobile communication device.

11. The optical fiber connection measurement system according to claim 10, wherein the mobile communication device is configured to communicate at least the test request to the communication module and the controller from the distal end of the one of the outgoing optical fibers.

12. The optical fiber connection measurement system according to claim 1, further comprising a distal extension or launch fiber for a reflection based connection quality test, wherein the distal extension or launch fiber is at least connectable to the distal end of the one of the outgoing optical fibers.

13. The optical fiber connection measurement system according to claim 1, wherein at least one of the communication module, the test module and the controller is configured to connect to a user device for at least upload of connection quality test results, to inform the user, through the user device, of the connection quality test results upon installation of the connection.

14. An optical fiber connection measurement method to test distal connection quality of individual outgoing optical fibers at a hub, the method comprising:
    receiving a test request from a distal end of one of the outgoing optical fibers;
    optically connecting a test module and a proximal end of one of the optical fibers associated with the distal end from which the test request is received; and
    testing the connection quality of the one of the optical fibers associated with the distal end from which the test request is received.

15. The optical fiber connection measurement method according to claim 14, further comprising:
    any one or more than one of upload of connection quality test results to and download of test module setting parameters from a remote server.

16. A non-transitory computer-readable storage medium storing instructions that, when executed by a processor, causes the processor to perform the method of claim 14.

17. The optical fiber connection measurement system according to claim 10, wherein the mobile communication device is an optical transceiver, a mobile phone, a tablet, and/or a computer.

18. The optical fiber connection measurement system according to claim 1, wherein the test module comprises an optical time domain reflection 'OTDR' module.

19. The optical fiber connection measurement method according to claim 14, wherein the testing of the connection quality of the one of the optical fibers associated with the distal end from which the test request is received comprises optical time domain reflection 'OTDR' based testing.

\* \* \* \* \*